United States Patent
Wang et al.

(10) Patent No.: US 9,693,237 B2
(45) Date of Patent: *Jun. 27, 2017

(54) OPTIMIZATION OF CELLULAR NETWORK ARCHITECTURE BASED ON DEVICE TYPE-SPECIFIC TRAFFIC DYNAMICS

(71) Applicants: AT&T Intellectual Property I, L.P., Atlanta, GA (US); Board of Trustees of Michigan State University, East Lansing, MI (US)

(72) Inventors: Jia Wang, Randolph, NJ (US); Lusheng Ji, Randolph, NJ (US); Xiang-Yang Alexander Liu, Okemos, MI (US); Muhammad Zubair Shafiq, East Lansing, MI (US)

(73) Assignees: AT&T Intellectual Property I, L.P., Atlanta, GA (US); Board of Trustees of Michigan State University, East Lansing, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/740,030

(22) Filed: Jun. 15, 2015

(65) Prior Publication Data
US 2015/0281977 A1 Oct. 1, 2015

Related U.S. Application Data

(63) Continuation of application No. 12/969,491, filed on Dec. 15, 2010, now Pat. No. 9,060,269.

(51) Int. Cl.
*H04W 16/04* (2009.01)
*H04W 16/22* (2009.01)
*H04B 17/391* (2015.01)
*H04W 24/08* (2009.01)

(52) U.S. Cl.
CPC ........ *H04W 16/22* (2013.01); *H04B 17/3913* (2015.01); *H04W 16/04* (2013.01); *H04W 24/08* (2013.01)

(58) Field of Classification Search
CPC ..................................................... H04W 16/22
See application file for complete search history.

(56) References Cited

U.S. PATENT DOCUMENTS

| | | | |
|---|---|---|---|
| 7,805,518 B1 | 9/2010 | Kamvar et al. | |
| 2007/0127490 A1* | 6/2007 | Barbosa Da Torre | H04W 16/18 370/395.2 |
| 2008/0215733 A1 | 9/2008 | Paul et al. | |
| 2008/0310322 A1* | 12/2008 | Tidestav | H04W 16/18 370/253 |

(Continued)

*Primary Examiner* — Hassan Phillips
*Assistant Examiner* — Omeed D Rahgozar

(57) ABSTRACT

A method, a computer readable medium and an apparatus for optimizing a cellular network architecture are disclosed. For example, the method obtains network traffic data for a plurality of different endpoint device types, wherein the network traffic data comprises network traffic data for each of the plurality of different endpoint device types, and predicts a future traffic pattern for one of the plurality of different endpoint device types based on the network traffic data. The method then adjusts a parameter of the cellular network architecture in response to the future traffic pattern predicted for the one of the plurality of different endpoint device types.

20 Claims, 3 Drawing Sheets

(56) References Cited

U.S. PATENT DOCUMENTS

| | | |
|---|---|---|
| 2009/0126023 A1 | 5/2009 | Yun et al. |
| 2009/0196255 A1 | 8/2009 | Gulbani et al. |
| 2010/0296403 A1* | 11/2010 | Qiu .................. H04W 28/22 370/252 |
| 2010/0316012 A1 | 12/2010 | Stanwood et al. |
| 2011/0113022 A1 | 5/2011 | Polychronidis |
| 2011/0183686 A1 | 7/2011 | Quinn |
| 2013/0019009 A1 | 1/2013 | Tremblay et al. |

* cited by examiner

OPTIMIZATION OF CELLULAR NETWORK ARCHITECTURE BASED ON DEVICE TYPE-SPECIFIC TRAFFIC DYNAMICS

This application is a continuation of U.S. patent application Ser. No. 12/969,491, filed Dec. 15, 2010, now U.S. Pat. No. 9,060,269, which is herein incorporated by reference in its entirety.

The present disclosure relates generally to communication networks and, more particularly, to a method and apparatus for optimizing a cellular network architecture based on device type-specific traffic dynamics.

BACKGROUND

In recent years, there has been an unprecedented increase in the volume of data traffic over cellular networks. This growth can be attributed to the multi-fold increase in the size of subscriber base with access to high-speed $3^{rd}$ generation (3G) networks. Also, the availability of smart phones supporting bandwidth intensive web applications has fueled increased traffic volume on cellular networks. To better understand the dynamics of users' bandwidth demands and improve service quality under the constraint of limited network resources, it is beneficial to understand the spatial and temporal patterns of traffic carried in a cellular network.

SUMMARY

In one embodiment, the present disclosure discloses a method, a computer readable medium and an apparatus for optimizing a cellular network architecture. For example, the method obtains network traffic data for a plurality of different endpoint device types, wherein the network traffic data comprises network traffic data for each of the plurality of different endpoint device types, and predicts a future traffic pattern for one of the plurality of different endpoint device types based on the network traffic data. The method then adjusts a parameter of the cellular network architecture in response to the future traffic pattern predicted for the one of the plurality of different endpoint device types.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer-readable medium and an apparatus for optimizing a cellular network architecture based on device type-specific traffic dynamics. Although the present disclosure is discussed below in the context of a cellular network architecture, the present disclosure is not so limited. Namely, the present disclosure can be applied to other types of network, wherein resources are allocated based on device type-specific traffic dynamics.

Figure 1:
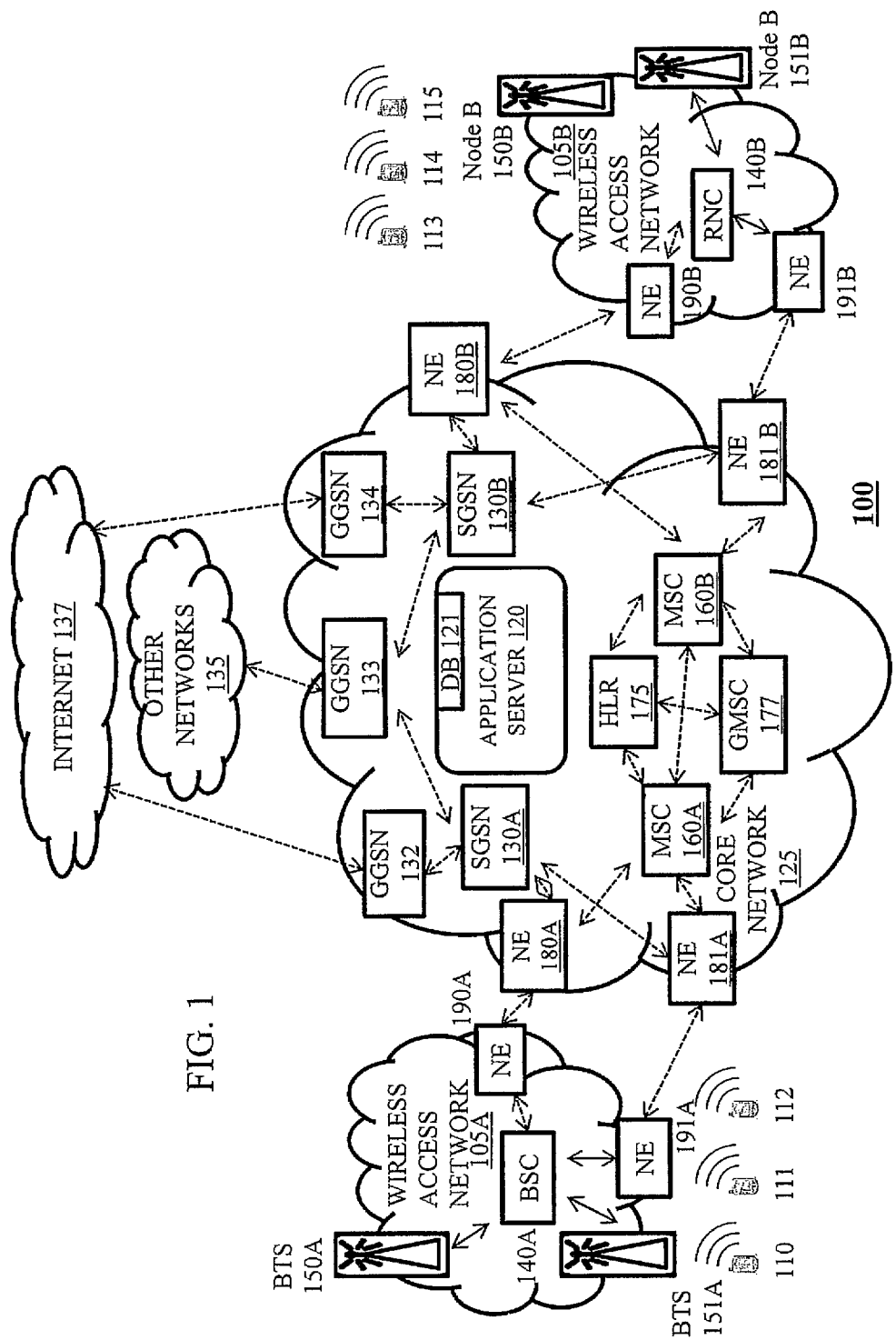
FIG. 1 illustrates an exemplary system related to the present disclosure.

To better understand the present disclosure, FIG. 1 illustrates an example network architecture 100 (e.g., an integrated cellular network architecture), related to the present disclosure. In particular, network architecture 100 includes exemplary wireless access networks 105A and 105B, and a core network 125 (e.g., a public land mobile network (PLMN)-General Packet Radio Service (GPRS) core network), suitable for implementing embodiments of the present disclosure for optimizing a cellular network architecture based on device type-specific traffic dynamics. In one embodiment, the core network 125 runs on top of a multi-protocol label switching (MPLS) backbone network. Wireless access network 105A may comprise a radio access network implementing such technologies as: global system for mobile communication (GSM), e.g., a base station subsystem (BSS), or IS-95, among others. In other words, wireless access network 105A may comprise a network in accordance with any 2G network technology. In the illustrative embodiment, wireless access network 105A is shown as a GSM radio access network.

In addition, wireless access network 105B may comprise substantially similar components and functions to those found in wireless access network 105A. However, wireless access network 105B may comprise a universal mobile telecommunications system (UMTS) network employing wideband code division multiple access (WCDMA), or a CDMA2000 network, among others. In other words, wireless access network 105B may comprise a network in accordance with any 3G, 4G or any other yet to be developed future wireless/cellular network technology. In the illustrative embodiment, wireless access network 105B is shown as a UMTS terrestrial radio access network (UTRAN) subsystem. Thus, the present disclosure is not limited to any particular type of wireless access network.

Each of the wireless access networks 105A and 105B is connected to the core network 125 to provide an integrated cellular network architecture (e.g., a cellular network architecture that includes multi-generational protocols and technologies). In the illustrative embodiment, network architecture 100 integrates both 2G and 3G wireless access technologies into one system. In particular, in the illustrative embodiment, core network 125 comprises a GPRS core network that provides packet-switching based core network support for both 2G and 3G wireless access networks (e.g., wireless access networks 105A and 105 respectively). Although in one embodiment network architecture 100 includes a GPRS core network integrated with a GSM wireless access network 105A and a UTRAN wireless access network 105B, the present disclosure is not so limited. Namely, the present disclosure may include any other different network configurations that are suitable for implementing embodiments for optimizing a cellular network architecture based on device type-specific traffic dynamics. For example, one or more of the wireless access networks 105A and 105B and/or core network 125 could include components in accordance with GSM evolution (EDGE) networks, Long Term Evolution (LTE) networks, and so on.

Furthermore, although certain components are depicted as residing within a particular portion of the network architecture 100, it should be understood that certain components may be located in other portions of the network architecture 100. For example, network components, such as application server 120 and mobile switching centers 160A and 160B, may be included in respective wireless access network portions (e.g., wireless access networks 105A and 105B) instead of being deployed within the core network 125, or in other portions of network architecture 100 that are not shown, while providing essentially the same functionality.

In addition, other logical and/or physical arrangements for deploying network architecture 100 may be implemented in accordance with the present disclosure. Thus, for example, MSC 160A may actually reside within a Public Land Mobile Network (PLMN) portion of the network architecture 100 that may reside within, overlap with, and/or interface with a packet-switched portion of the network architecture 100, e.g., GPRS core network 125. For example, a PLMN portion of network architecture 100 may include such components as MSC 160A, MSC 160B, network element (NE) 180A, NE 180B, NE 181A, NE 181B, home location register (HLR) 175, gateway mobile switching center (GMSC) 177, application server (AS) 120, and other components (not shown). Additional details and variations of this nature are omitted for simplicity and to improve clarity of understanding with respect to the claimed embodiments. Thus, for the purposes of the following discussion, it is assumed that the described embodiments are implemented within the exemplary embodiment of network architecture 100 depicted in FIG. 1.

Referring to wireless access network 105A, the access network is configured to facilitate communication between users, such as the users of wireless endpoint devices 110-112, and/or users of wireless endpoint devices 113, 114, and 115 of another wireless access network, such as wireless access network 105B. It should be noted that the communication can also be one-way, such as retrieving a news page over the Internet. In fact, the communications may be facilitated with other networks 135 which may comprise any packet switched or circuit switched networks, e.g., public land mobile networks (PLMNs), Voice over Internet Protocol (VoIP) networks, Service over Internet Protocol (SoIP) networks, Asynchronous Transfer Mode (ATM) networks, Frame Relay networks, and, the internet 137.

In one embodiment, the wireless endpoint devices 110-115 may comprise any customer endpoint devices configured for wireless communication such as personal computers, laptop computers, Personal Digital Assistants (PDAs), mobile phones, smart phones, email devices, messaging devices, and the like. In addition, these endpoint devices may be further distinguished from one another based upon a manufacturer, model, version, edition, and the like, as described in greater detail below. It should be noted that different endpoint devices will have different pricing models as well. For example, the physical links between wireless endpoint devices 110-112 and the wireless access network 105A comprise radio frequency (RF) signals between the one or more base stations 150A-151A (e.g., base transceiver stations (BTSs)) and the wireless endpoint devices 110-112. Here only two base stations 150A and 151A are depicted as part of wireless access network 105A. However, it should be appreciated that the wireless access network 105A may comprise more or less base stations depending upon the size and needs of the network.

To manage the communications of multiple users serviced by the wireless access network 105A, the wireless access network 105A may comprise one or more network elements. For example, wireless access network 105A may comprise one or more base station controllers (BSCs) for managing RF communication of the base stations 150A-151A. Although only one BSC 140A is depicted in wireless access network 105A, it should be understood that various similar configurations are possible. For example, each base station 150A-151A could be serviced by its own BSC. Alternatively, BSC 140A could control a plurality of base stations. Each of the base stations 150A and 151A may communicate with BSC 140A via an A-bis interface. In addition, in a network with multiple base station controllers, the base station controllers may communicate with one another over an IuR-G interface. BSC 140A performs a variety of wireless network management related tasks such as wireless channel assignments, determining transmission power levels, controlling handovers from one base station to another base station, concentrating multiple signals from wireless endpoint devices for onward transmission to other portions of the wireless access network 105A and other networks 135, and others functions.

In some embodiments the BSC 140A may provide transcoding functions between wireless communication formats used by the base stations 150A-151A and wireless endpoint devices 110-112 and internet protocol (IP) formats used by wireless access network 105A and other networks 135, e.g., one or more external networks, which may comprise a PLMN operated by a different network provider. For example, the BSC 140A may forward communications to additional networks via network elements (NEs) 190A or 191A, which may comprise gateways or border elements providing, e.g., connectivity between the wireless access network 105A, core network 125, the internet 137, and one or more other networks 135.

Each of the base stations 150A-151A comprises, at a minimum, a RF transceiver, and is configured to receive and transmit RF signals to and from wireless endpoint devices (e.g., wireless endpoint devices 110-112 and to communicate with other elements within the wireless access network 105A and core network 125 (e.g., mobile switching center (MSC) 160A, application server 120, etc.). Base stations 150A-151A may support calls for a plurality of users with wireless endpoint devices 110-112.

As mentioned above, wireless access network 105B (e.g., a UMTS UTRAN radio access network) may comprise substantially similar components with substantially similar functions to those described in connection with wireless access network 105A (e.g., a GSM radio access network). For example, base stations 150B-151B (referred to as NodeBs in UMTS-UTRAN terminology) may functional in substantially the same manner as base stations 150A-151A (referred to as BTSs in GSM 2G terminology). In addition, radio network controller (RNC) 140B (e.g., a 3G UMTS RNC) may provide substantially similar functionality to that of a 2G GSM base station controller (BSC), such as BSC 140A in wireless access network 105A. Furthermore, network elements (NEs) 190B and 191B may function in substantially the same manner as NEs 190A and 191A respectively. Although only three wireless endpoint devices are depicted in communication with each of the wireless access networks 105A and 105B respectively, it should be understood that base stations 150A-151A and 150B-151B may support any number of users/wireless endpoint devices. For example, a customary 3G base station transceiver using W-CDMA may be capable of supporting several hundred simultaneous calls on each 5 MHz frequency band/spectrum slice used.

Each of wireless access network 105A and 105B may interface with a core network 125 portion of network architecture 100, e.g., via network elements 190A-191A and 190B-191B respectively. Although only four connections between each of the wireless access networks 105A and 105B and the core network 125 are shown, it should be understood that an arbitrary number of connections between each of the wireless access networks and the core network may exist. For example, network element (NE) 190A may interface with any number of serving GPRS support nodes (SGSNs) in the core network 125. Alternatively, or in addition, additional network elements within wireless access network 105A may provide connections between wireless access network 105A and core network 125 via one or many SGSNs in core network 125. NE 190A may facilitate communication between BSC 140A in wireless access network 105A and SGSN 121 in core network 125 via a Gb interface to route data calls. In addition, NE 190A may facilitate communication between BSC 140A and mobile switching center (MSC) 160A via core network NE 180A over an A-interface for voice calls. In addition, NEs 191A, 190B and 191B may share the same or substantially similar functionality to NE 190A with respect to voice and data calls as described herein.

In one embodiment, core network 125 includes components of a public land mobile network (PLMN) to support voice calls from and among users/mobile endpoint devices. For example, core network 125 may include one or more mobile switching centers (MSCs) for each wireless access network that forms part of the network architecture 100. For example, MSC 160A may be designated to serve and administer wireless access network 105A. Similarly, MSC 160B may be designated to serve wireless access network 105B. The MSC 160A may maintain user profile records for wireless endpoint devices currently serviced by base stations within the portion of the network that is the responsibility of MSC 160A (e.g., wireless endpoint devices 110, 111 and 112). The MSC 160A may also function as a media gateway and/or media gateway controller for facilitating communication between the wireless access network 105A and the core network 125. Thus, the MSC 160A may be responsible for connecting calls from users of mobile endpoint devices 110-112 to other wireless users or to users on other networks 135. BSC 140A may communicate with the MSC 160A via an A-interface for routing voice calls (e.g., via NEs 190A and/or 191A and NEs 180A and/or 181A). Furthermore, BSC 140A may communicate with serving GPRS support node (SGSN) 130A using a Gb interface. The transmission protocol of the Gb interface may be based on a packet protocol, e.g., an internet protocol or a frame relay protocol. It should be noted that some of the functions described herein with respect to the BSC 140A may be performed by the MSC 160A, and vice versa. Those skilled in the art will appreciate that other and different configurations are possible consistent with the teachings herein.

In one embodiment, voice calls are forwarded from the wireless access networks to mobile switching centers (MSCs 160A and 160B) that are in communication with a gateway mobile switching center (GMSC) 177. When a MSC receives a new incoming call setup request, the MSC may forward the call to the GMSC for processing. In particular, when GMSC 177 receives a voice call from a mobile device (e.g., one of wireless endpoint devices 110, 111, or 112), the GMSC 177 determines which MSC bears responsibility for an area being visited by the called party. The voice call is then forwarded to the MSC being visited by the called party. The core network 125 may further include a home location register (HLR) 175 which functions as a central repository of authentication and service validation information, subscription information, and other information pertaining to user subscriptions and services. Similarly, respective visiting location registers (VLRs) (not shown) may be located in each of the wireless access networks 105A and 105B, which function as temporary repositories of authentication and service validation information, subscription information, and other information pertaining to visiting user subscriptions and services.

For example, HLR 175 may comprise a centralized repository serving a wireless/cellular network service provider's entire network. On the other hand, a VLR may be a localized component that temporarily stores a user's subscriber information when the user's wireless endpoint device is located in a particular geographic region serviced by a particular VLR. In addition, HLRs and/or VLRs may provide the subscriber information to the relevant MSC, BSC, or GMSC to support the functionalities of the MSC, BSC, or GMSC as described above.

With respect to core network 125, components servicing data calls/data applications may include serving GPRS support nodes (SGSNs), gateway GPRS support nodes (GGSNs), and related support components including media servers, application servers, and the like. A serving GPRS support node (SGSN) refers to a network node responsible for communicating with user endpoint devices and routing of data calls. For example, a SGSN may send and receive data packets to and from user endpoint devices in the coverage area of the SGSN. In the example of FIG. 1, core network 125 includes two SGSNs 130A and 130B which serve endpoint devices using wireless access networks 105A and 105B, respectively.

A gateway GPRS support node (GGSN) refers to a network node responsible for the interworking between a GPRS network (e.g., components of core network 125 that support GPRS services and functionality) and external packet switched networks, e.g., the internet or other networks. For example, GGSNs 132-134 in FIG. 1 convert GPRS data packets coming from the SGSNs 130A and 130B into the packet data protocol (PDP) format of an external packet network. For example, the GPRS packet may be converted to an internet protocol packet prior to being sent to an external network that is internet protocol based. Thus, the GGSN and SGSN components of the GPRS core network 125 support data call functionality between wireless endpoint devices and entities external to the integrated cellular network architecture 100.

In general, in a 3$^{rd}$ generation partnership project (3GPP) network, the setup of a data call may be summarized as follows. A wireless endpoint device requests connectivity to an external network or service by providing a corresponding Access Point Name (APN) to the GRPS cellular network architecture. During the PDP Context activation phase for a mobile device (e.g., a cellular device, such as any of wireless endpoint devices 110-115), the SGSN serving the mobile cellular device performs a DNS lookup to determine which GGSN(s) are configured for serving the requested APN for the mobile cellular device. The APN for a large external network may be mapped to a number of GGSNs, while a small external network may only be mapped to a single GGSN. GGSN mapping can also be based on load or mobile cellular device location during this process to improve data service quality. The identities of the mapped GGSN or GGSNs are then returned to the SGSN and the SGSN selects one to create a new PDP Context for the mobile device. In the case of IP network access, at the end of the PDP Context activation process, the mobile device also receives its IP address.

The core network 125 may also include, in one embodiment, an application server (AS) 120. The application server 120 may include a database (DB) 121 suitable for facilitating the optimization of a cellular network architecture based on device type-specific traffic dynamics, as will be described in greater detail below. The application server 120 may be configured to provide one or more functions for supporting voice and data calls, and for collecting and using information derived from such calls. For example, application server 120 may comprise any server or computer that is well known in the art, and the database 121 may be any type of electronic collection of data that is also well known in the art. In addition, the application server 120 may be connected directly or indirectly to any one or more network elements of the network architecture 100 configured to gather and forward network traffic data and other information and statistics to the application server. Due to the relatively large number of connections available between the application server 120 and other network elements, none of the actual links to the application server are shown in FIG. 1.

In one embodiment, the application server 120 may periodically query network elements to provide current or past network traffic data to be stored in database (DB) 121 and/or to be processed by the application server. Alternatively, any one or more of the network elements in wireless access networks 105A and 105B and/or core network 125 may be configured to automatically transmit relevant data to the application server 120. Regardless of the manner in which the application server 120 receives and/or obtains relevant data, e.g., network traffic data, from the providing network elements, the data may be stored in database 121 for concurrent or later use in optimizing the cellular network architecture based on device type-specific traffic dynamics, as will be described in greater detail below.

The foregoing description of an integrated cellular network architecture 100 is provided as an illustrative example only. Rather, the embodiment of network 100 is merely illustrative of one network configuration that is suitable for implementing embodiments of the present disclosure. The current disclosure discloses a method, computer readable medium and apparatus for optimizing a cellular network architecture based on device type-specific traffic dynamics. To better understand the dynamics of users' bandwidth demands and to improve service quality under the constraint of limited network resources, it is important to understand the spatial and temporal patterns, particularly with respect to internet traffic, carried in a cellular network architecture.

In one embodiment, the present disclosure obtains network traffic data in a cellular network architecture and analyzes the data for different device types. In one illustrative example, the traffic data can be further broken down by application type for each device type. Through such analysis, a model of network traffic may be developed which captures the aggregate traffic patterns, or traffic dynamics, broken-down by device type and application type. Using such a training data set and/or current network traffic data, user demand and resource consumption can be predicted. For example, a training data set and current network traffic data can be fit to predictive models and provide insight into different usage behavior of the users and/or different types of devices and their respective applications. These observations may then be exploited to enable advanced management of device type-specific (and/or application-specific) resource allocation in the cellular network. This process is described in greater detail below in connection with the exemplary method 200 depicted in FIG. 2.

Figure 2:
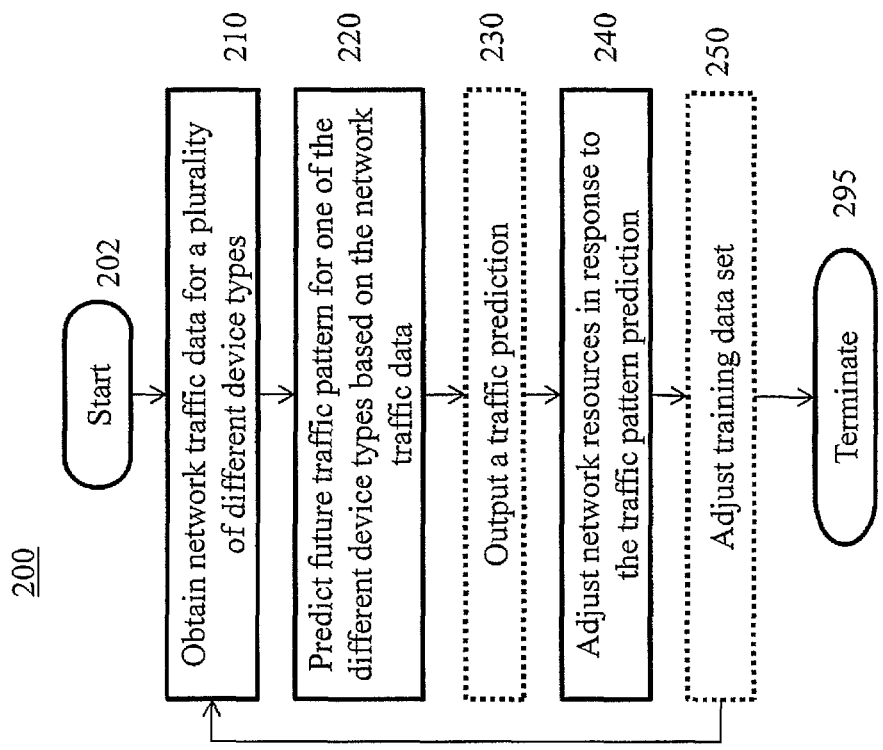
FIG. 2 illustrates a flowchart of a method for optimizing a cellular network architecture based on device type-specific traffic dynamics.

FIG. 2 illustrates a flowchart of a method 200 for optimizing a cellular network architecture based on device type-specific traffic dynamics. The steps of the method 200 may be performed by any one or more of the components of the network architecture 100 depicted in FIG. 1. For example, one or more steps of the method 200 may be implemented by application server 120, MSC 160A or 160B, SGSN 130A or 130B, or BSC 140A or 140B in FIG. 1. Alternatively, one or more steps of the method 200 may be implemented by a general purpose computer having a processor, a memory and input/output devices as illustrated below in FIG. 3. Although any one of the elements in core network 125, wireless access network 105A and/or wireless access network 105B, may be configured to perform various steps of the method 200, the method will now be described in terms of an embodiment where steps of the method are performed at an application server, such as application server 120 in FIG. 1.

The method 200 begins in step 202 and proceeds to step 210. At step 210, the method obtains network traffic data for a plurality of different device types. For example, the network traffic data may comprise a number of records, each record comprising a summary report of activity during one particular data session and/or voice session by one wireless endpoint device. Further, the network traffic data records may be collected from an operator's core network (e.g., core network 125 in FIG. 1). In one embodiment, the network traffic data records are indexed by a timestamp and a hashed mobile device identity (to preserve anonymity of individual mobile devices/users). In addition, each record may contain a device type identifier, which may include the manufacturer, model, firmware version and other similar features which distinguish one device type from another. Each record may also include a cell identifier, which identifies the cell that serves the device (e.g., the serving base station), one or more application identifiers identifying the application(s) used in the session, and usage statistics for the session, such as a total number of bytes, total number of packets, and total number of flows during that session. A typical web browsing activity, for example, may consist of multiple sessions, each of which in turn may consist of multiple flows, each containing several packets of different sizes, resulting in several different records that may be included in the network traffic data. In one embodiment, the device type identifier includes the Type Allocation Code (TAC) portion of an International Mobile Equipment Identifiers (IMEI) number for a particular wireless endpoint device.

In one embodiment, the network traffic data comprises current network traffic data observed in the relevant cellular network architecture. For example, raw network traffic data may be obtained and/or collected by monitoring devices of core network 125 or wireless access networks 105A and 105B configured to monitor network traffic. In one embodiment, the network traffic analyzed includes GPRS tunneling protocol (GTP) message exchanges. For example, BSCs 140A and 140B, NEs 190A and 180B, SGSNs 130A and 130B, MSC 160A and any other component of network 100 may be configured to monitor network traffic and create/store raw network traffic data derived from the underlying network traffic. In one embodiment, the network traffic data pertains to voice data calls/applications. Thus, the raw network traffic data may be gathered by GPRS components of network 100 including but not limited to SGSNs 130A-130B, GGSNs 132-134, and other network elements supporting data calls/applications such as BSC 140A, RNC 140B, and the like. In another embodiment, the network traffic data pertains to voice calls. Thus, the network traffic data may be gathered by PLMN components of network 100 including but not limited to MSCs 160A-160B, BSC 140A, RNC 140B, GMSC 177 and other network elements supporting voice calls In still another embodiment, network traffic data for both voice and data applications are gathered and analyzed together throughout the rest of the method 200.

In one embodiment, the monitoring devices may store the raw network traffic data locally. Alternatively, the monitoring devices may create aggregated network traffic data records based upon underlying network traffic observed. In one embodiment, the method 200 queries one or more of the component devices collecting network traffic data periodically to obtain the collected raw network data or aggregated network traffic data records (i.e., the current network traffic data). In another embodiment, the method 200 obtains the raw network traffic data or aggregated records automatically. For example, the component devices may send the raw network traffic data and/or summary records periodically without being prompted.

In another embodiment, the network traffic data may comprise a training data set. For example, the network traffic data may include current network traffic data and historic network traffic data in the form of a training data set. In one embodiment, the training data set may be stored by the method 200 (e.g., in a portion of database 121). The training data set may, in one embodiment, simply comprise network traffic data records from a time period prior to a present time period when the current network traffic data is obtained by the method 200.

In one embodiment, the training data set may contain statistics and data which summarize network traffic patterns for particular endpoint device types for a period of a prior day, a prior week, a prior month, a particular day of the week over a period of a previous month or year, or even on a particular holiday over the past several years. In one embodiment, the training data set summaries network traffic patterns over a time period configured by a user. In addition, the training data set may summarize network traffic patterns for particular endpoint devices types further broken-down by application types used by the particular devices types. For example, the training data set may contain records which indicate for a particular endpoint device type the amount of usage between and among different applications invoked by the endpoint device. In one example, a record, or records, may indicate that applications A and B constitute 90% of all call setup requests for a particular endpoint device type and dominate all other applications. If the training data set already includes summary network traffic patterns (as opposed to basic network traffic data records) the summary information may be processed by a Zipf-like model for traffic distribution by application type and a Markov chain model for aggregate traffic dynamics, as described below in connection with step 220. It should be noted that the present disclosure is not limited to having the traffic distribution model being restricted to Zipf-like model. Other more generic distribution models, such as Gamma distribution may also be applied to model the traffic distribution. Likewise, to model aggregate traffic dynamics, one can also use traffic time series models such as ARIMA given that enough training data is available because ARIMA requires much more training data.

Exemplary application types include voice call applications, voice mail applications, text messaging applications, data call applications, short message service (SMS) applications, email applications, web browsing applications, streaming video applications, instant messaging applications, and the like. However, in a typical large cellular network architecture there may be several hundred actual application type categories over which network traffic data is collected. It should be noted that the statistics of the data on the network may change as new network traffic data is obtained and incorporated into the training data set. The training data set is updated by incorporating new network traffic data. This process is described in greater detail below in connection with optional step 250. In still another embodiment, the network traffic data comprises both current network traffic data and a training data set as described above. In this situation, both current traffic patterns and past traffic patterns are integrated to determine a future traffic pattern based upon both inputs.

In step 220, the method 200 analyzes the network traffic data to make a traffic prediction. For example, application server 120 may be configured to make predictions about future traffic patterns based upon network traffic data records (i.e., current network traffic data and/or a training data set). In one embodiment, the process for analyzing network traffic data to make a future traffic prediction can be summarized as follows. First, the method 200 segregates the network traffic data records obtained in step 210 for different types of devices. For instance, different devices have different features and specifications which may affect their traffic patterns in different ways. Moreover, different types of devices may attract different groups of users who may use the cellular network in different ways. In one embodiment, records pertaining to particular device types are segregated from one another based upon Type Allocation Code (TAC) numbers preserved in hashed device identifiers in the network traffic data records. Such information can be used to identify the type, make, model, first release date, version and other distinguishing parameters of the endpoint device generating the corresponding data (or voice) session of a particular network traffic data record. Notably, in a large cellular network operated by a large service provider, several thousand TACs may map to several hundred different device types. As mentioned above, the training data set may include summary statistics which may already account for different device types and different applications in use. However, in the present example, it is assumed that the training data set only includes basic network traffic data records that have not yet been manipulated.

In one embodiment, in addition to segregating the network traffic data by device type, the method 200 further segregates the network traffic data by application type. For example, the network traffic data manipulated in this way may show for a particular endpoint device type the amount of usage between and among different applications invoked by the endpoint device type. In one embodiment, after the network traffic data is segregated by device type and/or application type, the method 200 may further analyze the network traffic data to observe current and/or past trends and patterns in order to predicted future traffic dynamics of the network.

The foregoing describes in general terms the process followed by the method 200 in analyzing the network traffic data to make a traffic prediction. A more detailed discussion of the process flow is provided below. In particular, in one embodiment predicting network traffic patterns using the network traffic data may involve several preliminary actions including (1) modeling the long-term distribution of traffic volume versus constituent applications, e.g., using a Zipf-like distribution, and (2) capturing the temporal dynamics of aggregated traffic, e.g., using a Markov chain model.

With respect to modeling the distribution of traffic volume by application type, an illustrative analysis of the traffic volume in an exemplary large cellular network architecture revealed a highly skewed distribution, e.g., where the top 10% of applications constituted 99% of the traffic volume. This type of distribution is well suited for modeling by a Zipf-like model where an object of rank X has a probability P and $P \sim X^{-b}$, with b being an experimentally determined or a preselected constant. Thus, in one variation, a Zipf-like power law model of the form $P \sim X^{1+1/b}$ is used to model the long term distribution of traffic volume versus application type. For example, a plot of a number of normalized bytes per flow versus each application ranked in reverse order by volume is fitted to a Zipf-like power law model.

With respect to modeling the temporal dynamics of aggregated traffic, results of the analysis showed strongly recurring aggregate traffic patterns based upon time of day usage across all device types, implying that present network traffic conditions may share a statistical correlation with earlier network traffic conditions. In other words, some degree of correlation may exist between the traffic volume for a particular device type at, for example, 1:00 p.m. on one day and 1:00 p.m. on the next day, and so on. The particular extent to which a current state may be inferred from past state(s) may be captured by two different measures: autocorrelation and relative mutual information (RMI). Autocorrelation describes the correlation between the random variable in a stochastic process at different points in time or space and ranges in value from −1 to 1. In one experiment in a large cellular network architecture, when considering only average network traffic conditions (without regard to device type) broken into periods of one hour time, the autocorrelation function for a current state and all $n^{th}$ prior states, showed peaks at n=24, 48, 72, and so forth. In other words, each day showed measurable similarities to the traffic patterns observed on the next day, and so forth. However, the observed peaks in the autocorrelation function declined in magnitude the greater the separation in time between the current state and the $n^{th}$ prior state.

The relative mutual information (RMI) quantifies the amount of information that a random variable $X_t$ provides about $X_{t+1}$ (separated by one unit of time lag), while providing a measure of uncertainty about $X_{t+1}$. In the same experiment, it was determined based upon a preliminary analysis of pair-wise relative mutual information that there was a redundancy to considering state pairs separated in time greater than 24 hours. Thus, in one embodiment, a $23^{rd}$ order discrete time Markov chain is used to model the traffic volume. For a $n^{th}$ ordered discrete time Markov chain with q possible values of states, the total number of probability parameters is $(q-1)q^n$. With N=23 and q=10 this results in $9*10^{23}$ probability parameters. Thus, the number of parameters is quite large. Accordingly, in one embodiment the parameters are recursively combined until a desired number of parameters is reached. The desired number may be determined based upon the number of network traffic data records available to train the model. In any event, such a discrete time Markov chain model derived from the network traffic data may be used to forecast future traffic volume.

In one embodiment, the discrete time Markov chain model is separated into two independent sub-models, one for weekday traffic and another for weekend traffic. In particular, the dependency of a particular state of network traffic data on a weekday is more strongly dependent upon the past states of the network traffic data from weekdays only, whereas the dependency of a particular state of network traffic data on a weekend is more strongly dependent upon the past states of the network traffic data when considering only weekend records for the past network traffic data. Furthermore, separate models for special holidays, such as Christmas or Black Friday on Thanksgiving can be used. Refining the discrete time Markov chain model in this way may improve the overall accuracy of the model (and therefore the accuracy of its predictive power).

The previous example considers only aggregate network traffic without regard to the differences in traffic patterns from device type to device type. However, the present disclosure further refines the process of modeling the temporal dynamics of aggregated traffic by developing separate Zipf-like models and Markov chain models for each of a number of different device types, or groups of similar device types. It should be noted that it is possible to have a unique Zipf-like model and Markov chain model to model the traffic dynamics for each individual device type. However, in practice the feasibility of this approach is limited since there are at least several hundred unique device types being used in a typical large cellular network architecture. Accordingly, in one embodiment, clusters of device type groups that share similar usage patterns and/or characteristics are created. For instance, two or more wireless endpoint devices may show similar traffic patterns (e.g., usage peaks at the same times of day and days of the week, the same usage volumes at most times, etc.) and may be analyzed together in some instances. In just one example, the behavior of different device types can be clustered into distinct subgroups. For example, an unsupervised clustering algorithm such as k-means algorithm can be utilized with spatial and temporal feature sets to effectively cluster device types.

Once a device type cluster is determined, the network traffic data records pertaining to all of the device types of the cluster are aggregated for creating Zipf-like models for the distribution of traffic and Markov chain based models for the temporal dynamics of the traffic. In addition, Zipf-like models of the traffic distribution by application type and Markov chain based models of the temporal traffic dynamics may be created for each of a number of other device type clusters. In addition, a set of all such models may be used as a mathematical basis for predicting future traffic patterns based on prior and/or current observed states of the network traffic as recorded in the network traffic data obtained by the method 200 in step 210.

For instance, based on Zipf-like models and Markov chain models created in step 220, the method 200 may determine for example that in general, later manufactured devices of the same family (e.g., the same manufacturer) show an overall greater data usage, as exhibited by a greater number of bytes, packets and or flows per session, over all relevant time periods than earlier manufactured devices. In one embodiment, the method 200 may derive from any one or more of the models that, e.g., smart phone A is used for a greater volume of internet streaming video applications, whereas smart phone B is used for a greater volume of voice calls and email applications. Alternatively the method 200 may determine that smart phone A tends to have peak usage during lunchtime and evening hours on weekdays, and substantially lower usage at all times on weekends. In particular, the method 200 may derive such information from a Markov chain model that is segregated into sub-models for weekday and weekend traffic patterns. On the other hand, the method 200 may determine that smart phone B exhibits peak usage during business hours and less usage in the evenings and weekends. Similarly, in one example, a Zipf-like model may indicate that applications A and B constitute 90% of all call setup requests for a particular endpoint device type and dominate all other applications. Thus, in one embodiment, to conserve processing resources, only the dominating applications used by each particular device type are considered in making predictions as to future traffic conditions and deploying network resources in response thereto.

In addition to the foregoing, it should also be noted that in some embodiments, the gathering of network traffic data, analysis, and subsequent decision making process for deploying network resources, may be confined to a particular geographic area such as a particular state, a particular area code, a particular town, or even a particular radio access network. Thus, the above described modeling process may create device type specific models for a limited region, while a similar process with separate network traffic data records collection and analysis takes place separately in another geographic area. On the other hand, in one embodiment separate processes may take place in different geographic areas (e.g., in two different radio access networks such as radio access network 105A and 105B in FIG. 1), but the data may be shared in a centralized manner (e.g., at application server 120 in FIG. 1), such that both local and regional network traffic data may be considered and modeled.

In any event, based upon the models created from the network traffic data (e.g., Zipf-like models and Markov chain models), future traffic patterns can be predicted by the method 200. For example, the method 200 may observe a geographic clustering of users of smart phone B at or near a particular base station/cell that is persisting for more than one hour. For instance, a large business conference may be taking place at a particular location (e.g., near base station 150A in FIG. 1) and a large number of attendees may be users having a particular type of endpoint devices, e.g., smart phone B. While the method 200 may not be aware of the underlying reason for the clustering, the current network traffic data nevertheless shows a significantly greater concentration of smart phone B devices at the particular location at that particular time.

Based upon such information, as well as additional information that the method 200 may infer from the models derived from the network data set, that smart phone B users most heavily use voice and email applications (information that may be derived from a Zipf-like model of application usage). The method may also infer that smart phone B usage peaks during working hours (derived from a Markov chain model for smart phone B traffic). Thus, the method 200 may be able to predict an increased demand for voice and email services at a particular base station or cell which may be anticipated to persist until a particular time of the day.

In another scenario, the method 200 may observe based upon current network traffic data that an unusually large number of smart phone A devices in a particular cell or other geographic area are currently invoking or are participating in high bandwidth internet data sessions (i.e., requiring a large number of bytes/packets). This may be due to a large concert, sporting event or other situation where bandwidth intense video and/or social media applications are being used. In addition, based upon the models for smart phone A devices, the method 200 may determine that a clustering of smart phone A devices often occurs at the same time and day of the week, and that the clustering and increased usage from smart phone A devices usually persists for a duration from the time the first statistically significant clustering is observed. Given the foregoing information as inputs, the method may predict that an increased demand for high bandwidth internet data sessions may persist for a period of time in the relevant cell (e.g., at base station 150B).

The foregoing examples are provided for illustrative purposes only. It should be understood that numerous other, further and different situations may give rise to various other inferences, observations and predictions by the method 200 in step 220.

In optional step 230, the method 200 outputs a traffic prediction. For example, based upon the predictions made at step 220, the method 200 may send an alarm or a notification indicating the traffic prediction to a network management system, thereby enabling a network operator to make a decision regarding the current configuration of the network and deployment of network resources.

In step 240, the method 200 adjusts network resources in response to the traffic prediction. For example, in one of the above scenario, the method 200 may predict an increased demand for high bandwidth internet data sessions for smart phone A devices for the next four hours, e.g., at base station 150B in FIG. 1. In one embodiment, the method 200 may also have available additional information indicating that the cellular network services provider typically offers smart phone A to non-business subscribers for personal use subscriptions whereas the network provider typically offers smart phone B to subscriber of business subscription plans. In addition, personal use and business subscriptions plans may have different fees and provide for different guaranteed network performance parameters. For instance, a business subscription may provide for a greater guaranteed minimum bandwidth than personal use subscription plan (and may therefore have a relatively greater subscription fee). Based upon the traffic prediction from step 220 and this additional information, the method 200 may determine that for future calls from wireless endpoint devices associated with business subscriptions (e.g., smart phone B type devices and others) and originating in the same vicinity (e.g., near base station 150B in FIG. 1), that data tunnels set up for the devices associated with business subscriptions should have sufficient reserved/guaranteed capacity such that bandwidth is not a limiting factor.

For instance, in accordance with a business subscription plan, a baseline level of bandwidth may typically be reserved for a data tunnel for a particular device type and/or application. Customarily, while peak levels of bandwidth usage during the associated session may exceed the reserved bandwidth, statistical multiplexing of unreserved bandwidth among many devices served by the base station/cell/wireless access network is sufficient to accommodate temporary spikes in bandwidth usage during times of normal demand. However, due to predicted increased demand for high bandwidth internet data sessions for smart phone A devices for the next four hours, the typical statistical multiplexing of unreserved bandwidth may not be able to provide guaranteed/expected levels of network performance for business subscribers. Thus, an increased reserved bandwidth level for each data tunnel/session set up for business subscribers' devices may be warranted to account for the changed traffic dynamics. In one embodiment, a number of other parameters/factors pertaining to a data tunnel set-up for a new data (or voice) session may be adjusted (i.e., modified from a default level) based on the traffic pattern predicted. For example, one or more quality of service (QoS) parameters, such as throughput, jitter, maximum latency, error rate, loss ratio, may be adjusted up or down, depending upon the particular traffic patterns predicted.

Returning to an earlier example where the method 200 predicts that a large clustering of smart phone B devices will persist for a period of time on a particular day (e.g., due to a large business conference), the method 200 may determine several other adjustments to be made to the network in response to the prediction. For example, interference from neighboring cells/base stations may degrade the performance of a particular cell/base station. For example, interference may result in an increased number of retransmitted packets, unacknowledged signaling messages requiring retransmission after a timeout period, and the like. Accordingly, in one embodiment, when increased demand is expect to persist at a particular cell/base station, the method may instruct that particular cell/base station to increase its transmitting power to provide wireless links more robust to neighboring cell/base station interference.

Alternatively, the method 200 may instruct neighboring cells/base stations to reduce transmit power to enhance the performance of the wireless links for the cell/base station predicted to be impacted by the increased demand. For example, in the network of FIG. 1, the method 200 may determine that smart phone B devices are clustering at base station 150A and that the clustering is predicted to last until 5:00 p.m. The method may then instruct base station 151A which is nearby, or proximate to base station 150A, to reduce it transmit power by 10% until 5:00 p.m. In one embodiment, the instruction may be forwarded to BSC 140A via MSC 160A and intervening network elements such as NEs 180A, 181A, 190A and/or 191A. BSC 140A controlling base stations 150A and 151A may then cause base station 151A to reduce its transmitting power in accordance with the received instruction.

Similarly, the models derived from the network traffic data may show a regular recurring pattern that suggests a corresponding adjustment of network resources that should be made. For example, a commercial zone may border a residential zone. The commercial zone may have a base station/cell dominated in usage by smart phone B devices during daytime hours and with little demand from any devices in the evening hours. On the other hand the residential zone may be served by an adjacent cell/base station with greatest demand in the evening from smart phone A type devices. In this case, the method 200 may determine to boost the transmit power of the commercial zone's base station during the day and reduce the transmit power of the residential zone's base station at the same time, reversing the situation in the evening.

In another embodiment where the commercial zone and the residential zone have different base stations but share a base station controller (BSC), the method may determine that greater resources in the BSC should be reserved for voice calls and email applications during the day, to accommodate demand from smart phone B users in the commercial zone, and reserve more resources in the BSC for streaming video and other data applications in the evening to accommodate the increased demand from smart phone A users, whose usage tends to be dominated by internet, video and other data applications.

Returning to an earlier scenario where the method 200 determines that smart phone B devices are clustering at a particular cell/base station and that the clustering is predicted to persist for a period of time, the method may determine that additional resources in the core network (or wireless access network) for supporting voice calls should be allocated. This may be based upon the information derived from the training data set that smart phone B devices tend to use more voice and email applications, as opposed to data calls/applications, such as internet applications. Specifically, in one embodiment a core network may have at least one MSC dedicated to each wireless access network that interfaces with the core network. In addition, the core network may include a number of MSCs which are not permanently assigned to any particular wireless access networks, but which are available to be temporarily assigned on demand, and as needed. In the present example, with reference to FIG. 1, if the method 200 determine that smart phone B devices are clustering at base station 150A, the method may assign additional MSC(s) in the core network to serve wireless access network 105A and/or base station 150A in addition to MSC 160A. Having additional resources to support the specific applications that are used most heavily by users of the relevant device type improves network performance not only for the users of device type B in the affected area, but all users, including those having other device types and who are being served by the same base station and same wireless access network. Deploying network resources in this manner may also be useful for addressing recurring traffic patterns such as the situation with the neighboring residential and commercial zones described above. For example, each of the commercial and residential zones may have different radio access networks and/or different dedicated mobile switching centers (MSCs). One or more non-dedicated MSCs could be switched back and forth between serving the different zones on a regular basis that follows the recurring traffic pattern.

In still another example, the method 200 may predict at step 220 that a clustering of smart phone A devices in a particular area will last for the next several hours and that an increased demand for high bandwidth internet data sessions is expected. The underlying cause may be a large concert or sporting event, and a large number of users may be attempting to upload, download or share photographs and videos of the event via internet applications accessed via the users' smart phone A devices. However, it is not necessary for the method 200 to be aware the underlying cause, only that based upon past patterns in traffic dynamics for smart phone A devices and a current pattern in the network traffic data records matching the past patterns, that an increased demand for high bandwidth data sessions may be anticipated. In this case, the method 200 may determine that additional core network resources that support data calls should be allocated to the portion of the network serving base station 150B. More specifically, with respect to the network 100 in FIG. 1, the method 200 may devote additional SGSNs and GGSNs to serve base station 150B and/or wireless access network 105B. The assignment of these additional resources may increase the throughput for data sessions commencing from smart phone A devices (e.g., wireless endpoint devices 113-115) served by base station 150B. In addition, the allocation of additional resources to serve the expected traffic patterns of smart phone A devices at base station 150B may free other resources for other users who may be using other device types, different applications, and may not be involved in the underlying event causing the spike in demand.

In another example, the method 200 at step 220 may predict a local spike in usage demanding high bandwidth internet data sessions, e.g., associated with the smart phone A device type. For example, an unexpected newsworthy event may cause a large number of users with camera/video equipped phones (e.g., smart phone A) to be capturing and uploading video. Similarly, such an event may, for instance, attract the media and attract a large number of people who work for news agencies. In addition, workers in the media/news business may favor a particular type of mobile endpoint device (e.g., smart phone B). In either instance, the method 200 may determine that based upon the current traffic patterns and/or similar past traffic patterns derived from the training data set, that an additional base station in the area would alleviate some of the traffic load on the existing resources. For instance, the method 200 may automatically create a work order requesting that a mobile base station be temporarily deployed to the relevant area. Thus, an employee of the network provider may claim the work order and cause a mobile base station to be brought to the relevant area and set-up for use.

In optional step 250, the method 200 adjusts the training data set. For example, the training data set may include summary statistics for network traffic data/network usage segregated by device type, application type, and various other parameters, such as time of day, day of week, geographic location, and the like. The summary statistics may include Zipf-like and Markov chain models for different device types, device type groups and application types. If the training data set includes such models, the models may be updated to account for the current network traffic data being added. On the other hand, the training data set may simply comprise historic network traffic data that has not been manipulated. In either case, the current network traffic data is thus incorporated into the training data set and aggregated with the previous traffic data to provide an updated training data set. In turn, the updated training data set can be used in subsequent iterations of the method 200 as the network operator may continuously monitor the current network traffic data and predict future traffic dynamics based upon the current network traffic data and/or the training data set. At step 295, the method terminates.

Although examples are described in connection with the exemplary method 200 wherein both current network traffic data and a training data set are used to create traffic predictions, in some cases one or the other input may dominate the prediction of future traffic patterns. For example, the training data set may so strongly predict a particular traffic pattern for a particular device type on a particular day, that the current network traffic data may have little bearing upon the traffic patterns predicted for the rest of the day. For instance, smart phone B, popular with business subscribers, may show recurringly weak usage/demand on major holidays every year. This may be reflected by statistics (e.g., models) stored in, or calculable from the training data set. Thus, current network traffic data showing weak demand patterns for smart phone B devices is largely superfluous. In practical terms, this means that the current network traffic data for device type B may have little influence the deployment of network resources. For instance, the network provider may confidently determine, far in advance, that greater resources should be allocated to data calls (i.e., internet, streaming video, etc.) than email applications on holidays since users of smart phone B frequently avoid checking email on holidays, as exhibited by the traffic patterns for smart phone B reflected in the training data set.

In some cases, the temporal aspects of past traffic patterns may not be relevant to determining how to deploy network resources based upon more immediate network traffic patterns of a particular device type. For example, a technical convention attended by users of smart phone B may create an immediate local demand for certain applications favored by users of smart phone B. The method 200 may detect a clustering of smart phone B devices based on network traffic data, e.g., current network traffic data. However, past traffic dynamics for device type B are not necessary in order for the network provider to determine that smart phone B is driving an immediate local demand, e.g., for email services and voice services, that requires rapid deployment of additional resources tailored to such needs. In other words, only information pertaining to traffic volume by application type of smart phone B (e.g., the data reflected in a Zipf-like model) is required, whereas temporal patterns (e.g., the data reflected in a Markov chain model for smart phone B) are irrelevant.

In addition, although embodiments are described wherein traffic patterns are analyzed, predictions made, and network resources allocated based upon specific device types as well as specific application types, it should be understood that in certain embodiments only the traffic patterns of a particular device type are relevant. Conversely, in some embodiments the specific device type is unimportant and only traffic patterns pertaining to a particular application type are required. For instance, mobile endpoint devices of diverse types may all be equipped with short message service (SMS) applications. In addition, current network traffic data may show unusually high SMS traffic in a particular region/location that matches a past pattern found in the training data set. Thus, the method 200 may determine to deploy additional SMS resources without regard to the specific device types that are driving the increased demand for SMS services. Of course it should be noted that in many cases, merely knowing the device types behind the increased demand for services is sufficient to predict the type of applications that are being most heavily invoked. Specifically, for a certain device type, a handful of applications may always be observed to dominate the network usage for that particular device type. Thus, traffic patterns for particular device types and particular applications may be largely correlated in many instances.

Furthermore, while examples have been provided referring to smart phones A and B, and certain examples distinguish such devices based upon business and personal use subscriptions, the present disclosure is not so limited. Namely, a typical large cellular network provider will support users having hundreds of different wireless endpoint device types and different subscription plan types. Thus, the above examples may artificially assume that only one or two wireless endpoint device types dominate the network. In reality, a typical large cellular network is vastly more diverse and the traffic patterns may be more nuanced. In addition, some of the different wireless endpoint device types may share substantially similar traffic patterns/traffic dynamics. For example, smart phone C may appeal to similar users as smart phone A (e.g., personal use subscribers). Thus, current network traffic data and/or the training data set may show similar traffic patterns among smart phone C devices and smart phone A devices. Accordingly, in one embodiment, future traffic patterns may be predicted at step 220 and network resources deployed at step 240 based upon traffic patterns observed for groups or families of device types and/or applications. Such groups or families of device types may be created using a k-means algorithm, as described above, and subsequent Zipf-like and Markov chain models created based on the network traffic data for the entire group of device types.

In addition, although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application.

Figure 3:
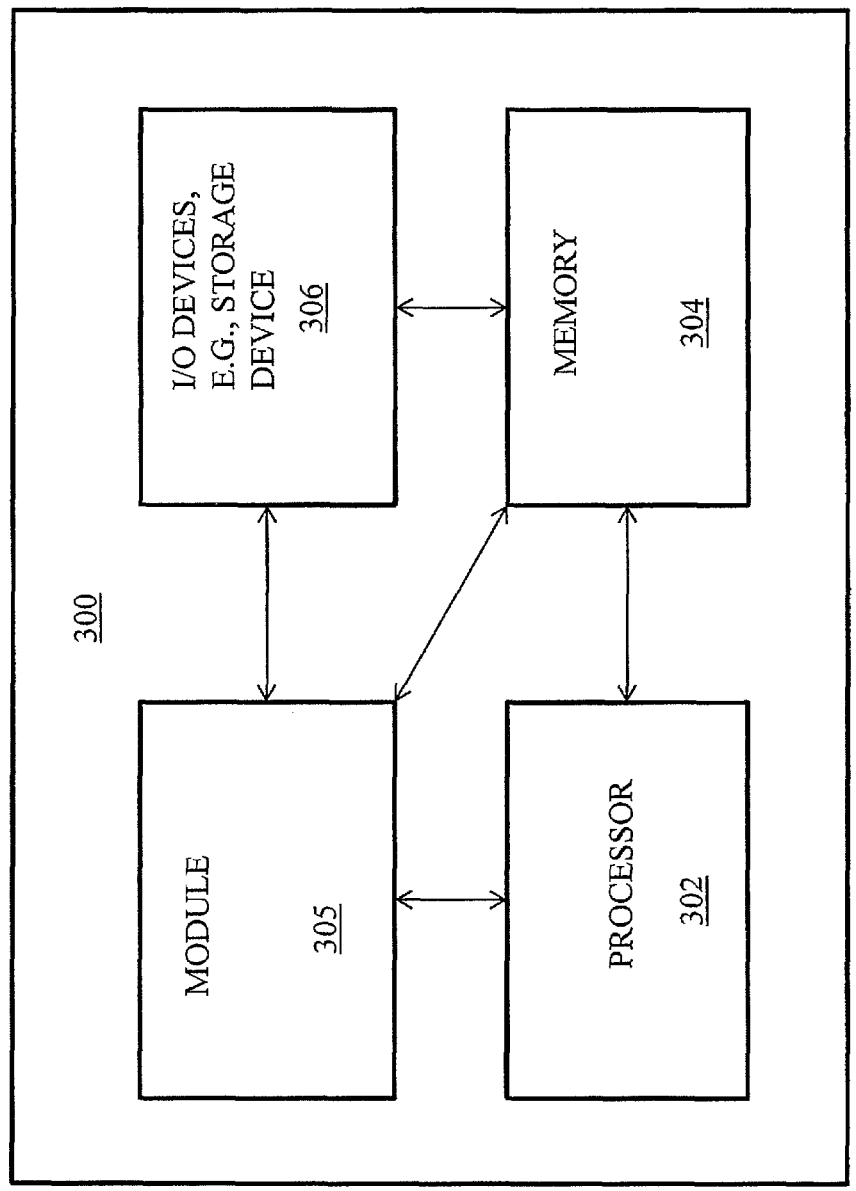
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for optimizing a wireless access network based on device-type specific traffic dynamics, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 305 for optimizing a wireless access network based on device-type specific traffic dynamics can be loaded into memory 304 and executed by processor 302 to implement the functions as discussed above. As such, the present method 305 for optimizing a wireless access network based on device-type specific traffic dynamics (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for adjusting a parameter of a cellular network, comprising:
    obtaining, by a processor in communication with a non-transitory computer-readable medium, network traffic data for a plurality of different endpoint device types, wherein the network traffic data is derived from general packet radio services tunneling protocol messages of the cellular network, wherein the network traffic data comprises current network traffic data and a training data set comprising past network traffic data, wherein the network traffic data comprises network traffic data for each of the plurality of different endpoint device types, wherein each of the plurality of different endpoint device types comprises a different physical endpoint device type, wherein the network traffic data is stored in a plurality of records, wherein each record contains a device type identifier that identifies an endpoint device type of the plurality of different endpoint device types;
    segregating, by the processor, at least one record in the plurality of records based on a device type identifier that identifies one of the plurality of different endpoint device types;
    predicting, by the processor, a future traffic pattern for the one of the plurality of different endpoint device types based on the at least one record in the plurality of records that contain the device type identifier that identifies the one of the plurality of different endpoint device types, wherein the predicting comprises:
        creating a model for the network traffic data that is specific to the one of the plurality of different endpoint device types, wherein the model indicates a degree of correlation between a present network traffic state represented by current network traffic data and a number of past network traffic states represented by the training data set; and
        determining, using the model, that a geographic concentration of endpoint devices of the one of the plurality of different endpoint device types is expected at a first base station of the cellular network; and
    adjusting, by the processor, the parameter of the cellular network in response to the future traffic pattern predicted for the one of the plurality of different endpoint device types.

2. The method of claim 1, wherein the network traffic data comprises current network traffic data.

3. The method of claim 1, wherein the predicting comprises:
    creating a Zipf-like distribution model for the network traffic data that is specific to the one of the plurality of different endpoint device types, wherein the Zipf-like distribution model segregates the network traffic data according to a number of application types.

4. The method of claim 1, further comprising:
    updating the training data set based on the current network traffic data.

5. The method of claim 1, wherein the adjusting the parameter comprises:
    adding a mobile base station to the cellular network proximate to the first base station.

6. The method of claim 1, wherein the adjusting the parameter comprises:
    decreasing a transmit power in a second base station proximate to the first base station.

7. The method of claim 1, wherein the adjusting the parameter comprises:
    increasing a transmit power of the first base station.

8. The method of claim 1, wherein the processor is a processor of an application server.

9. The method of claim 1, wherein the network traffic data comprises a type allocation code identifying a particular endpoint device type.

10. A non-transitory computer readable medium storing instructions which, when executed by a processor, cause the processor to perform operations for adjusting a parameter of a cellular network, the operations comprising:
    obtaining network traffic data for a plurality of different endpoint device types, wherein the network traffic data is derived from general packet radio services tunneling protocol messages of the cellular network, wherein the network traffic data comprises current network traffic data and a training data set comprising past network traffic data, wherein the network traffic data comprises network traffic data for each of the plurality of different endpoint device types, wherein each of the plurality of different endpoint device types comprises a different physical endpoint device type, wherein the network traffic data is stored in a plurality of records, wherein each record contains a device type identifier that identifies an endpoint device type of the plurality of different endpoint device types;
    segregating, by the processor, at least one record in the plurality of records based on a device type identifier that identifies one of the plurality of different endpoint device types;
    predicting a future traffic pattern for the one of the plurality of different endpoint device types based on the at least one record in the plurality of records that contain the device type identifier that identifies the one of the plurality of different endpoint device types, wherein the predicting comprises:

creating a model for the network traffic data that is specific to the one of the plurality of different endpoint device types, wherein the model indicates a degree of correlation between a present network traffic state represented by current network traffic data and a number of past network traffic states represented by the training data set; and determining, using the model, that a geographic concentration of endpoint devices of the one of the plurality of different endpoint device types is expected at a first base station of the cellular network; and adjusting the parameter of the cellular network in response to the future traffic pattern predicted for the one of the plurality of different endpoint device types.

11. The non-transitory computer readable medium of claim 10, wherein the network traffic data comprises current network traffic data.

12. The tangible non-transitory computer readable medium of claim 10, wherein the predicting further comprises:

creating a Zipf-like distribution model for the network traffic data that is specific to the one of the plurality of different endpoint device types, wherein the Zipf-like distribution segregates the network traffic data according to a number of application types.

13. The non-transitory computer readable medium of claim 10, further comprising, updating the training data set based on the current network traffic data.

14. The non-transitory computer readable medium of claim 10, wherein the adjusting the parameter comprises:

adding a mobile base station to the cellular network proximate to the first base station.

15. The tangible non-transitory computer readable medium of claim 10, wherein the adjusting the parameter comprises:

decreasing a transmit power in a second base station proximate to the first base station.

16. The non-transitory computer readable medium of claim 10, wherein the adjusting the parameter comprises:

increasing a transmit power of the first base station.

17. The non-transitory computer readable medium of claim 10, wherein the processor is a processor of an application server.

18. The non-transitory computer readable medium of claim 10, wherein the network traffic data comprises a type allocation code identifying a particular endpoint device type.

19. An apparatus for adjusting a parameter of a cellular network, the apparatus comprising:

a processor; and a non-transitory computer-readable medium storing instructions which, when executed by the processor, cause the processor to perform operations, the operations comprising:

obtaining network traffic data for a plurality of different endpoint device types, wherein the network traffic data is derived from general packet radio services tunneling protocol messages of the cellular network, wherein the network traffic data comprises current network traffic data and a training data set comprising past network traffic data, wherein the network traffic data comprises network traffic data for each of the plurality of different endpoint device types, wherein each of the plurality of different endpoint device types comprises a different physical endpoint device type, wherein the network traffic data is stored in a plurality of records, wherein each record contains a device type identifier that identifies an endpoint device type of the plurality of different endpoint device types;

segregating at least one record in the plurality of records based on a device type identifier that identifies one of the plurality of different endpoint device types;

predicting a future traffic pattern for the one of the plurality of different endpoint device types based on the at least one record in the plurality of records that contain the device type identifier that identifies the one of the plurality of different endpoint device types, wherein the predicting comprises:

creating a model for the network traffic data that is specific to the one of the plurality of different endpoint device types, wherein the model indicates a degree of correlation between a present network traffic state represented by current network traffic data and a number of past network traffic states represented by the training data set; and determining, using the model, that a geographic concentration of endpoint devices of the one of the plurality of different endpoint device types is expected at a first base station of the cellular network; and adjusting the parameter of the cellular network in response to the future traffic pattern predicted for the one of the plurality of different endpoint device types.

20. The apparatus of claim 19, wherein the predicting comprises:

creating a Zipf-like distribution model for the network traffic data that is specific to the one of the plurality of different endpoint device types, wherein the Zipf-like distribution model segregates the network traffic data according to a number of application types.

* * * * *